US012717378B2

(12) United States Patent
Zhang

(10) Patent No.: US 12,717,378 B2
(45) Date of Patent: Aug. 25, 2026

(54) ELECTRONIC DEVICE

(71) Applicant: Lenovo (Beijing) Limited, Beijing (CN)

(72) Inventor: Xu Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 124 days.

(21) Appl. No.: 18/759,381

(22) Filed: Jun. 28, 2024

(65) Prior Publication Data

US 2025/0004500 A1 Jan. 2, 2025

(30) Foreign Application Priority Data

Jun. 30, 2023 (CN) ........................ 202310798369.0

(51) Int. Cl.
*G06F 1/16* (2006.01)
*G09G 3/00* (2006.01)

(52) U.S. Cl.
CPC ........... *G06F 1/1616* (2013.01); *G09G 3/035* (2020.08)

(58) Field of Classification Search
CPC ..... G06F 1/1616; G06F 1/1652; G09G 3/035; H04M 1/0216; H04M 1/0268
See application file for complete search history.

(56) References Cited

U.S. PATENT DOCUMENTS

2008/0062625 A1* 3/2008 Batio .................... G06F 1/1647 361/679.55
2012/0314399 A1* 12/2012 Bohn ................. H04M 1/0268 361/679.01
2017/0003714 A1* 1/2017 Kwon ..................... G06F 3/147
2023/0171902 A1* 6/2023 Kim ...................... B32B 15/095
2023/0176629 A1* 6/2023 Cho ...................... G06F 1/1681 361/679.27

OTHER PUBLICATIONS

Gadget Fight: Xiaomi Dual Flex or Xiaomi Mix Flex [online] [Retrieved Dec. 15, 2025] <URL: https://www.youtube.com/watch?v=Fy2GuTyEfPk> (Year: 2019).*
The Verge: Unfolding the first trifold phone [online] [Retrieved Dec. 15, 2025] <URL: https://www.youtube.com/watch?v=OiYpqxSaiNQ> (Year: 2020).*

* cited by examiner

*Primary Examiner* — King Y Poon
*Assistant Examiner* — Vincent Alexander Providence
(74) *Attorney, Agent, or Firm* — ANOVA LAW GROUP, PLLC

(57) ABSTRACT

An electronic device includes a body assembly and a display assembly. The body assembly includes a processing device that is configured to at least process image data. The display assembly includes a first part and a second part, and is configured to display the image data. The display assembly is configured such that when the first part faces a first direction, the second part is capable of facing a second direction.

15 Claims, 20 Drawing Sheets

ELECTRONIC DEVICE

CROSS-REFERENCE TO RELATED APPLICATION

This application claims priority to Chinese Patent Application No. 202310798369.0, filed on Jun. 30, 2023, the entire content of which is incorporated herein by reference.

TECHNICAL FIELD

The present disclosure generally relates to the field of electronic technologies and, more particularly, to an electronic device.

BACKGROUND

Electronic devices are devices that people often use. An electronic device includes a body structure and a display structure. However, the display structure is generally only provided on one side of the body structure. The form of the electronic device lacks diversity, and the adaptability of the electronic device is poor.

SUMMARY

In accordance with the present disclosure, there is provided an electronic device including a body assembly and a display assembly. The body assembly includes a processing device that is configured to at least process image data. The display assembly includes a first part and a second part, and is configured to display the image data. The display assembly is configured such that when the first part faces a first direction, the second part is capable of facing a second direction.

NUMERAL REFERENCES

Figure 1:
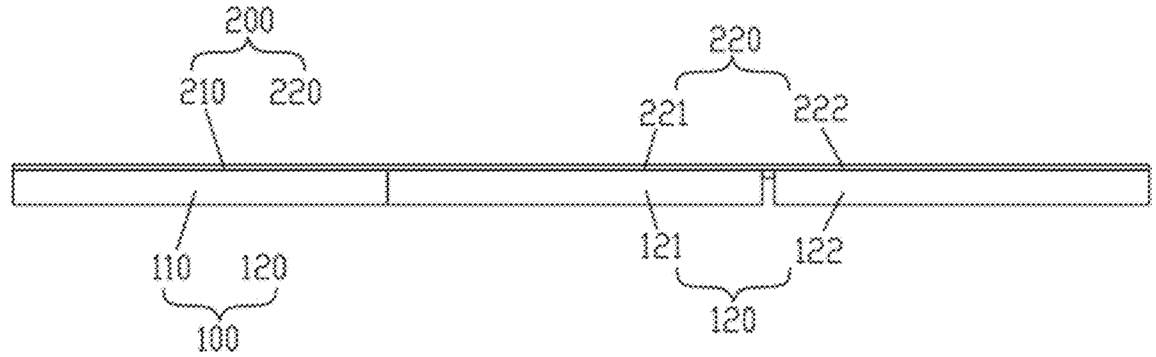
FIG. 1 is a structural schematic diagram of an electronic device consistent with the present disclosure.

100—Body assembly; 110—First body; 111—Bracket part; 112—Guide rail part; 113—Rotation part; 120—Second body; 121—First sub-body; 1211—First groove; 1212—Slide groove; 1213—Guide bush; 122—Second sub-body; 1221—Second groove; 123—Second tooth part; 130—Third body; 200—Display assembly; 210—First part; 220—Second part; 221—First region; 222—Second region; 230—Third part; 300—Rotation shaft assembly; 400—Gear assembly; 510—First elastic assembly; 511—First spring; 512—First movable member; 513—First tooth part; 520—Second elastic assembly; 530—Third elastic assembly; 540—Fourth elastic assembly; 600—Support assembly; 610—First protrusion; 620—Second protrusion; 630—Support piece; 640—First connection member; 650—Second connection member; 660—Buffer member; 700—Cover; 810—First support member; 820—Second support member

DETAILED DESCRIPTION OF THE EMBODIMENTS

Specific embodiments of the present disclosure are hereinafter described with reference to the accompanying drawings. The described embodiments are merely examples of the present disclosure and should not be regarded as limitations of this application. All other embodiments obtained by those of ordinary skill in the art without creative efforts fall within the scope of protection of the present disclosure.

In the present disclosure, unless otherwise stated and limited, the term “connection” should be understood in a broad sense. For example, it may be an electrical connection, or it may be an internal connection between two elements, or it may be a direct connection, or it may be an indirect connection through an intermediate medium. For those of ordinary skill in the art, the specific meaning of the above terms may be understood according to the specific circumstances.

It should be noted that the terms “first/second/third” involved in the embodiments of the present disclosure are only used to distinguish similar objects and do not represent a specific ordering of objects. It is understandable that the specific order or sequence of “first/second/third” may be interchanged where permitted. It is to be understood that objects described with “first/second/third” may be interchanged under appropriate circumstances such that the embodiments of the present disclosure described herein may be practiced in sequences other than those illustrated or described herein.

The present disclosure provides an electronic device. The electronic device includes a body assembly 100 and a display assembly 200. The body assembly 100 may include a processing device that is at least configured to process image data. The display assembly 200 may be configured to display the image data. The display assembly 200 may have its first part 210 facing a first direction and its second part 220 facing a second direction at the same time, enabling the display assembly 200 to display in both the first direction and the second direction. Therefore, the electronic device may be able to have different display forms and the adaptability of the electronic device may be greatly improved.

The present disclosure has no special limits on the structure of the electronic device. For example, in one embodiment, the electronic device may be a host device capable of generating the image data. In some other embodiments, the electronic device may be a notebook, a mobile phone, or a game console. In some other embodiments, the electronic device may be a display device that cannot generate the image data. For example, the electronic device may be a display.

In one embodiment, the display assembly 200 may be configured to display the image data. The present disclosure has no special limits on the structure of the display assembly 200. For example, in one embodiment, the display assembly 200 may be a flexible display screen. The display assembly 200 may be a structural assembly.

The present disclosure has no special limits on the implementation of the display assembly 200 having the first part 210 facing the first direction and the second part 220 facing the second direction at the same time. For example, the display assembly 200 may be a flexible display screen, and different parts of the flexible display screen may face different directions.

The present disclosure has no special limits on the first direction and the second direction. For example, the first direction and the second direction may satisfy the opposite condition. As an example, the first direction may be the back of the electronic device, and the second direction may be the front of the electronic device.

In one embodiment, the body assembly 100 may be configured to support the display assembly 200.

The present disclosure has no special limits on the type of the processing device as long as the processing device is able to process the image data.

For example, in one embodiment, the processing device may be a processor capable of generating the image data. The processing device may transmit the image data to the display assembly for display through an internal interface of the electronic device. As an example, the processing device may be a central processing unit (CPU). As another example, the processing device may be a graphics processing unit (GPU).

In another embodiment, the processing device may be a processor that is able to analyze image signals. The processing device may receive external image signals, analyze the received image signals into the image data that is able to be recognized by the display assembly, and control the display assembly to display the image data. The electronic device may also include an external interface, and the processing device may receive the external image signals in a wired or wireless manner through the external interface. As an example, the processing device may include a Scaler processing module.

The present disclosure has no limit on the structure of the body assembly 100, as long as the body assembly 100 is able to support the display assembly 200 with the first part 210 facing the first direction and the second part 220 facing the second direction. For example, in one embodiment, one side end or two side ends of the body assembly may be able to be stretched or retracted. During the stretching/retracting process of one side end or two side ends of the body assembly, a portion of the display assembly may be switched between the first direction and the second direction to realize that the first part 210 of the display assembly 200 faces the first direction while the second part 220 faces the second direction at the same time. As another example, in another embodiment, one side end or two side ends of the body assembly may be able to be rotated from the front to the back of the electronic device through a rotation shaft structure. When one side end or two side ends of the body assembly are rotated, a portion of the display assembly may be switched between the first direction and the second direction to realize that the first part 210 of the display assembly 200 faces the first direction while the second part 220 faces the second direction at the same time.

In one embodiment, the body assembly 100 may include two bodies, and the display assembly 200 may be disposed at the two bodies. The two bodies may be able to move relative to each other, such that the first part 210 of the display assembly 200 faces the first direction while the second part 220 faces the second direction at the same time. The relative movement of the two bodies may be relative sliding or rotation of the two bodies.

In another embodiment, the body assembly 100 may include three bodies, and the display assembly 200 may be disposed at the three bodies. The three bodies may be connected using a double shaft structure, and two bodies at two ends may be folded on the back of the middle body through rotation, such that the first part 210 of the display assembly 200 faces the first direction while the second part 220 faces the second direction at the same time.

In another embodiment, the body assembly 100 may include three bodies. The three bodies may be connected using a double slide rail structure. Two bodies at two ends may be able to slide relative to the middle body, such that the first part 210 of the display assembly 200 faces the first direction while the second part 220 faces the second direction at the same time.

In another embodiment, the body assembly 100 may include two bodies, and the two bodies may move relative to each other, such that the first part 210 of the display assembly 200 faces the first direction while the second part 220 faces the second direction at the same time. Further, two parts of one body may be able to rotate relative to each other to achieve the inward folding of the two parts of the body.

In one embodiment, the body assembly 100 may include a first body 110 and a second body 120. The second body 120 may include a first sub-body 121 and a second sub-body 122. The first body 110 may be movably connected to the first sub-body 121. The second sub-body 122 may be rotationally connected to the first sub-body 121. The display assembly 200 may include a first part 210 and a second part 220 adjacent to each other. The first part 210 may be disposed at the first body 110. The second part 220 may include a first region 221 and second region 222. The first region 221 may be disposed at the first sub-body 121 and the second region 222 may be disposed at the second sub-body 122. The first part 210 may be able to move to face the first direction or the second direction as the first body 110 moves relative to the first sub-body 121. Therefore, the orientation of the first part 210 may be changed through the first body 110, to increase the display attitude of the electronic device.

The present disclosure has no limit on the attitude formed by the first part 210 and the second part 220.

For example, in one embodiment, when the first part 210 faces the second direction and the first region 221 of the second part 220 and the second region 222 of the second part 220 meet a coplanar condition, the electronic device may be in a first usage mode. In this scenario, the first part 210 and the second part 220 may be located on the same side of the electronic device. For example, the first part 210 and the second part 220 may be located on the front side of the electronic device. The first part 210 and the second part 220 may satisfy the coplanar condition, as shown in FIG. 1.

The coplanar condition may refer to being coplanar or approximately coplanar.

Figure 4:
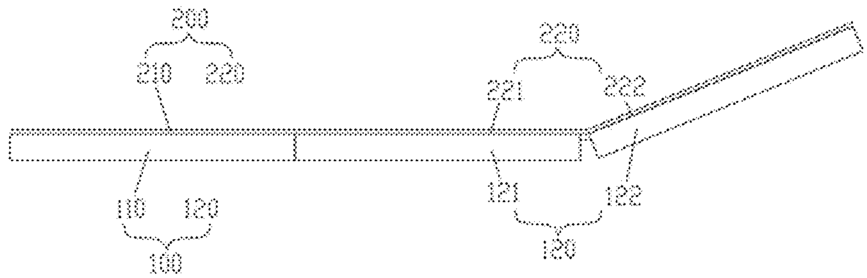
FIG. 4 is another structural schematic diagram of an electronic device consistent with the present disclosure.

As another example, in another embodiment, when the first part 210 faces the second direction and the first region 221 of the second part 220 and the second region 222 of the second part 220 form a first included angle, the electronic device may be in the second usage mode. In this scenario, the first region 221 of the second part 220 and the second region 222 of the second part 220 may be in a non-coplanar state, and the first region 221 of the second part 220 and the first part 210 may meet the coplanar condition, as shown in FIG. 4.

The present disclosure has no limit on the value of the first included angle.

Figure 2:
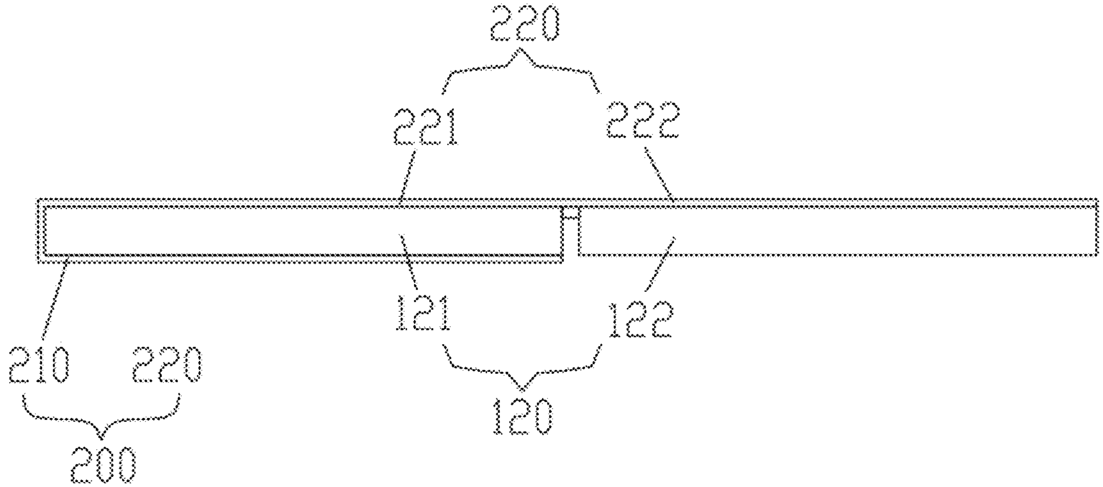
FIG. 2 is another structural schematic diagram of an electronic device consistent with the present disclosure.
Figure 3:
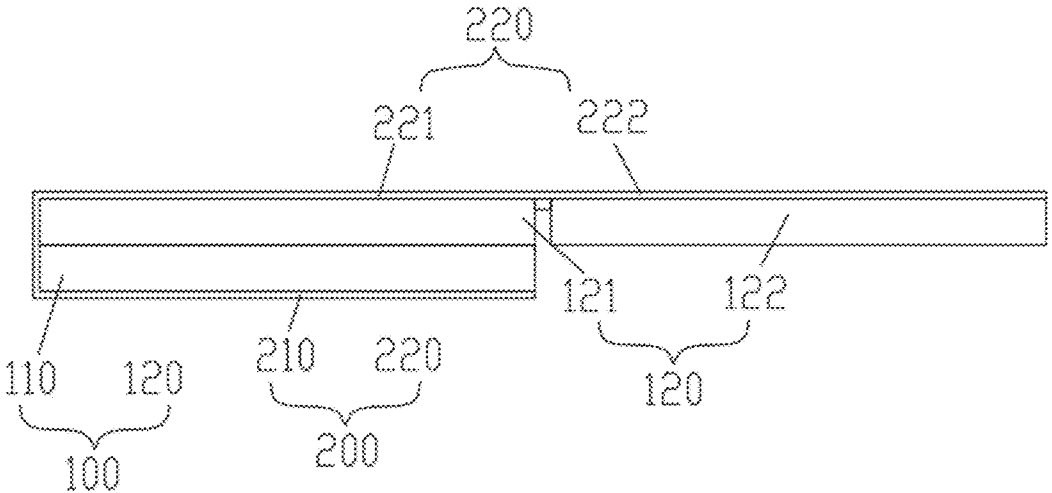
FIG. 3 is another structural schematic diagram of an electronic device consistent with the present disclosure.

As another example, in another embodiment, when the first part 210 faces the first direction and the first region 221 of the second part 220 and the second region 222 of the second part 220 meet the coplanar condition, the electronic device may be in the third usage mode. In this scenario, the first part 210 and the second part 220 may be located on different sides of the electronic device. For example, the first part 210 may be located on the back of the electronic device, and the second part 220 may be located on the front of the electronic device, as shown in FIG. 2 and FIG. 3.

Figure 5:
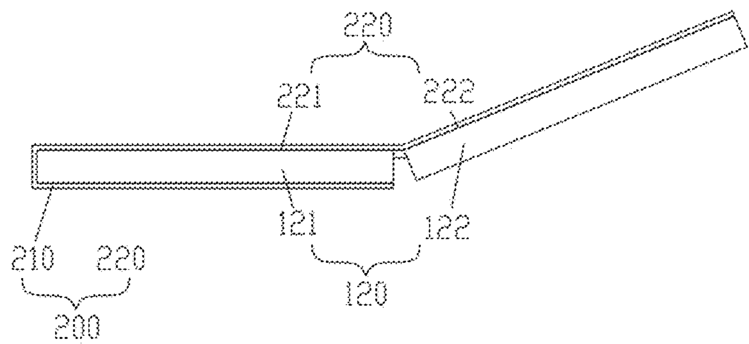
FIG. 5 is another structural schematic diagram of an electronic device consistent with the present disclosure.

In another embodiment, when the first part 210 faces the first direction and the first region 221 of the second part 220 and the second region 222 of the second part 220 form a second included angle, the electronic device may be in a fourth usage mode. In this scenario, the first region 221 of the second part 220 and the second region 222 of the second part 220 may be in a non-coplanar state. The first region 221 of the second part 220 and the first part 210 may be located on the back-to-back sides of the first sub-body 121, as shown in FIG. 5.

The present disclosure has no limit on the value of the second included angle. The value of the second included angle may be the same as or different from the value of the first included angle.

By rotating the second sub-body 122 relative to the first sub-body 121, the first region 221 of the second part 220 and the second region 222 of the second part 220 may satisfy the coplanar condition or form a certain included angle. By moving the first body 110 relative to the first sub-body 121, the first part 210 may be positioned in the first direction or the second direction. Therefore, the display assembly 200 may have different attitudes, and the length of the display assembly 200 may be changed at the same time. Also, the electronic device may be enabled to switch between different modes.

For example, when the first sub-body 121 rotates relative to the second sub-body 122, the electronic device may switch between the first usage mode and the second usage mode, such as, switch between the modes shown in FIG. 1 and FIG. 4. The electronic device may be also capable of switching between the third usage mode and the fourth usage mode, such as between the modes shown in FIG. 2 and FIG. 5.

As another example, when the first body 110 moves relative to the first sub-body 121, the electronic device may be able to switch between the first usage mode and the third usage mode. In one embodiment, when the first body 110 moves (e.g., moves translationally) relative to the first sub-body 121, the electronic device may switch between the modes shown in FIG. 1 and FIG. 2. In another embodiment, when the first body 110 rotates relative to the first sub-body 121, the electronic device may switch between the modes shown in FIG. 1 and FIG. 3.

As another example, when the first sub-body 121 rotates relative to the second sub-body 122 and the first body 110 moves (e.g., moves translationally) relative to the first sub-body 121, the electronic device may switch between the second usage mode and the fourth usage mode, such as switching between the modes shown in FIG. 4 and FIG. 5. The first included angle may be different from the second included angle. When the first sub-body 121 rotates relative to the second sub-body 122 and the first body 110 moves (e.g., moves translationally) relative to the first sub-body 121, the electronic device may switch between the first usage mode and the fourth usage mode, such as switch between the modes shown in FIG. 1 and FIG. 5.

The structures of the first sub-body 121 and the second sub-body 122 are not limited in the present disclosure. The first sub-body 121 and the second sub-body 122 may both be plate-shaped structures. The size of the first sub-body 121 and the size of the second sub-body 122 may be the same or substantially the same.

The first sub-body 121 and the second sub-body 122 may be able to rotate to an overlapping state. In some embodiments, the second region 222 may be able to move to be opposite to the first region 221 as the second sub-body 122 rotates relative to the first sub-body 121, that is, the first region 221 and the second region 222 may be sandwiched between the first sub-body 121 and the second sub-body 122. Of course, in other embodiments, the second region 222 may also be able to move as the second sub-body 122 rotates relative to the first sub-body 121 to be disposed opposite to the first region 221, that is, the first sub-body 121 and the second sub-body 122 may be sandwiched between the first region 221 and the second region 222.

The manner in which the first sub-body 121 and the second sub-body 122 are rotationally connected is not limited in the present disclosure. For example, the first sub-body 121 and the second sub-body 122 may be rotationally connected through a rotation shaft structure.

In one embodiment, the body assembly 100 may also include a rotation shaft assembly 300. The rotation shaft assembly 300 may include at least two rotation shafts. Adjacent rotation shafts of the at least two rotation shafts may be cooperatively connected through a gear assembly 400. One rotation shaft located at a first end of the at least two rotation shafts may be connected to the first sub-body 121, and one rotation shaft located at a second end of the at least two rotation shafts may be connected to the second sub-body 122. The first sub-body 121 may be able to rotate relative to the second sub-body 122 through the at least two rotation shafts.

Figure 6:
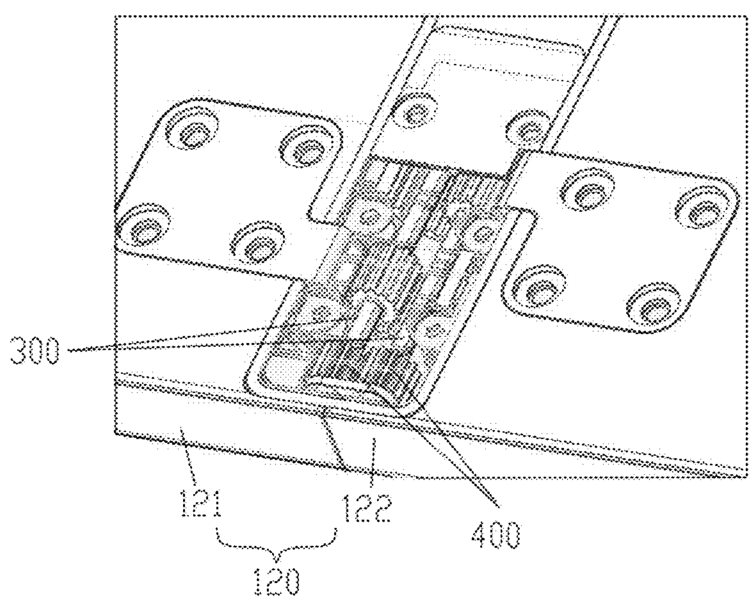
FIG. 6 is a partial structural schematic diagram of an electronic device consistent with the present disclosure.

The number of rotation shafts of the rotation shaft assembly 300 is not limited in the present disclosure. For example, in one embodiment shown in FIG. 6, the rotation shaft assembly 300 may include two rotation shafts, and the gears on the two rotation shafts may mesh.

Figure 7:
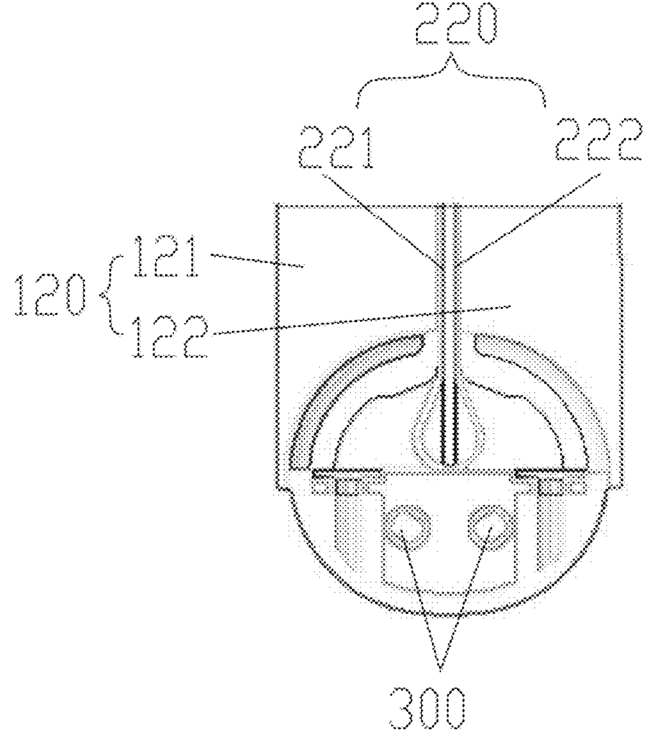
FIG. 7 is another partial structural schematic diagram of an electronic device consistent with the present disclosure.

In the overlapping state, the first region 221 and the second region 222 may be sandwiched between the first sub-body 121 and the second sub-body 122. The first sub-body 121, the rotation shaft assembly 300 and the first sub-body 121 may form an arc-shaped space on the side of the display assembly 200, such that the first sub-body 121, the rotation shaft assembly 300 and a connecting portion of the second region 222 and the first region 221 supported by the first sub-body 121 form an arc-shaped structure, as shown in FIG. 7. Therefore, the arc-shaped space may prevent the connection portion between the second region 222 and the first region 221 from being wrinkled or damaged.

The body assembly 100 may further include first elastic assemblies 510, second elastic assemblies 520, and a support assembly 600. The first elastic assemblies 510 may be connected to the first sub-body 121 and the first end of the rotation shaft assembly 300 respectively. The second elastic assemblies 520 may be connected to the second sub-body 122 and the second end of the rotation shaft assembly 300 respectively. The first end and the second end of the rotation shaft assembly 300 may be opposite to each other. At least a portion of the supporting assembly 600 may be disposed between the second part 220 and the rotation shaft assembly 300. The supporting assembly 600 and the first sub-body 121 may be connected through the third elastic assembly 530. The support assembly 600 and the second sub-body 122 may be connected through the fourth elastic assembly 540. When the first sub-body 121 rotates relative to the second sub-body 122, the distance from the support assembly 600 to the first sub-body 121 and the second sub-body 122 respectively may change, to spread a portion of the second part 220 corresponding to the rotation shaft assembly 300.

The second part 220 may be disposed outside the second body 120, that is, in the overlapping state, the first sub-body 121 and the second sub-body 122 may be sandwiched between the first region 221 and the second region 222.

The structure of the first elastic assemblies 510 is not limited in the present disclosure. For example, in one embodiment, one first elastic assembly 510 may include a first spring 511. The number of the first elastic assemblies 510 is not limited in the present disclosure. For example, in one embodiment shown in FIG. 8 and FIG. 9, two first elastic assemblies 510 may be disposed between the first sub-body 121 and the rotation shaft assembly 300 at intervals.

As an example, in one embodiment, one first elastic assembly 510 may further include: a first tooth part 513. The electronic device may further include: a second tooth part 123. The second tooth part 123 may be rotationally disposed at the first sub-body 121. The second tooth part 123 may cooperate with the first tooth part 513 to provide a damping force for the first sub-body 121 to move relative to the rotation shaft assembly 300, preventing the first sub-body 121 from moving too fast relative to the rotation shaft assembly 300.

Figure 11:
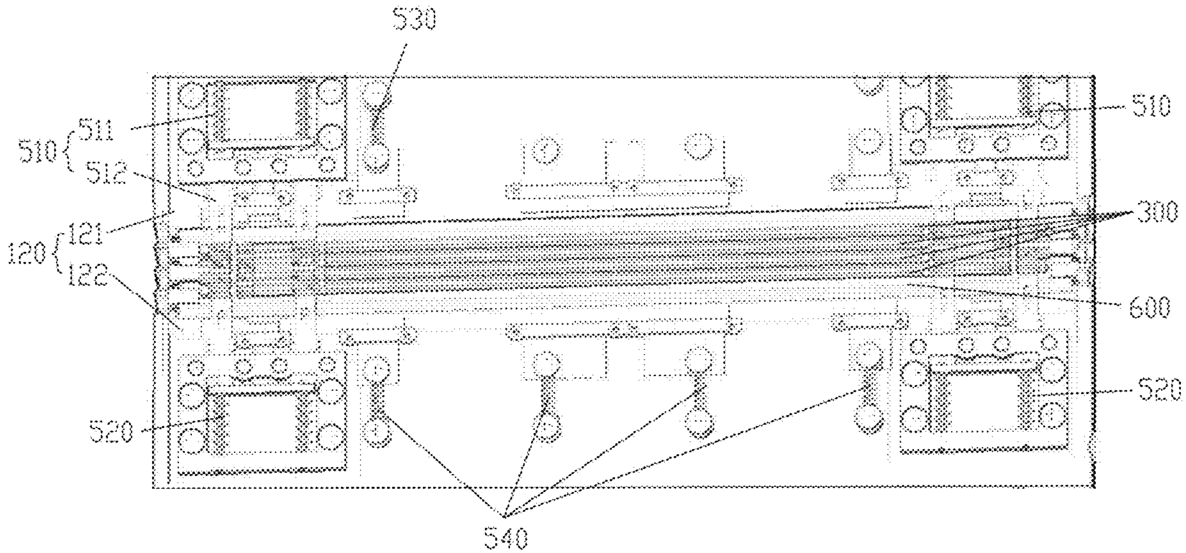
FIG. 11 is another partial structural schematic diagram of an electronic device consistent with the present disclosure.
Figure 12:
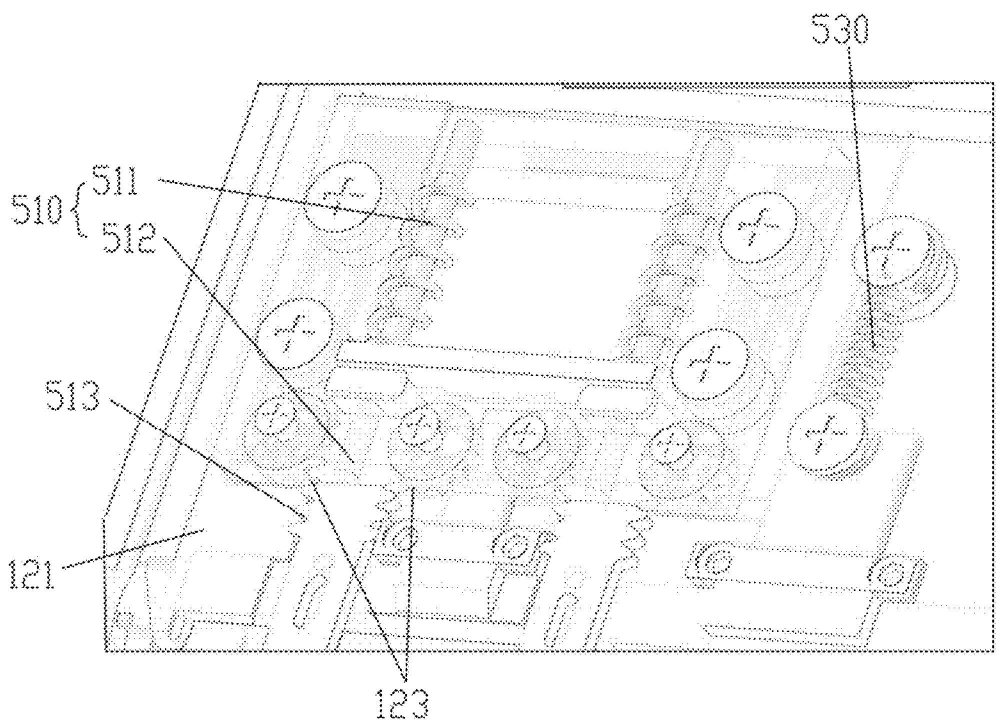
FIG. 12 is another partial structural schematic diagram of an electronic device consistent with the present disclosure.

The position of the first tooth part 513 is not limited in the present disclosure. For example, in one embodiment shown in FIG. 11 and FIG. 12, the first elastic assembly 510 may include: a first spring 511 and a first movable member 512. The first end of the first spring 511 may be fixedly connected to the first sub-body 121. The second end of the first spring 511 may be connected to the first end of the first movable member 512, and the second end of the first movable member 512 may be connected to the first end of the rotation shaft assembly 300. The first spring 511 and the first movable member 512 may pull the first sub-body 121 to move closer to the rotation shaft assembly 300. The first tooth part 513 may be disposed at the first movable member 512, and the second tooth part 123 may be disposed in the gear structure.

The structure of the second elastic assemblies 520 is not limited in the present disclosure. For example, in one embodiment, one second elastic assembly 520 may include a second spring. The number of the second elastic assemblies 520 is not limited in the present disclosure. For example, in one embodiment shown in FIG. 8 and FIG. 9, two second elastic assemblies 520 may be disposed between the second sub-body 122 and the rotation shaft assembly 300 at intervals.

The structure of the second elastic assemblies 520 may be similar to the first elastic assemblies 510 described in above embodiments.

In one embodiment, one second elastic assembly 520 may further include a third tooth part. The electronic device may further include a fourth tooth part. The fourth tooth part may be rotationally disposed at the second sub-body 122. The fourth tooth part may cooperate with the third tooth part to provide a damping force for the second sub-body 122 to move relative to the rotation shaft assembly 300, preventing the second sub-body 122 from moving too fast relative to the rotation shaft assembly 300.

The structure of the support assembly 600 is not limited in the present disclosure, as long as the support assembly 600 is able to deform as the first sub-body 121 rotates relative to the second sub-body 122.

For example, in one embodiment, the first end of the support assembly 600 may include at least two first protrusions 610. The at least two first protrusions 610 may cooperate with at least two first grooves 1211 of the first sub-body 121. The second end of the support assembly 600 may include at least two second protrusions 620. The at least two second protrusions 620 may cooperate with at least two second grooves 1221 of the second sub-body 122. When the first sub-body 121 rotates relative to the second sub-body 122, the length of a portion of one first protrusion 610 located in one corresponding first groove 1211 may change and the length of a portion of one second protrusion 620 located in one corresponding second groove 1221 may change, such that the support length of the support assembly 600 changes to support a portion of the second part 220 corresponding to the rotation shaft assembly 300. At the same time, since the at least two first protrusions 610 are located in the at least two first grooves 1211 and the at least two second protrusions 620 are located in the at least two second grooves 1221, the supporting assembly 600 may always support the portion of the second part 220 corresponding to the rotation shaft assembly 300.

Figure 10:
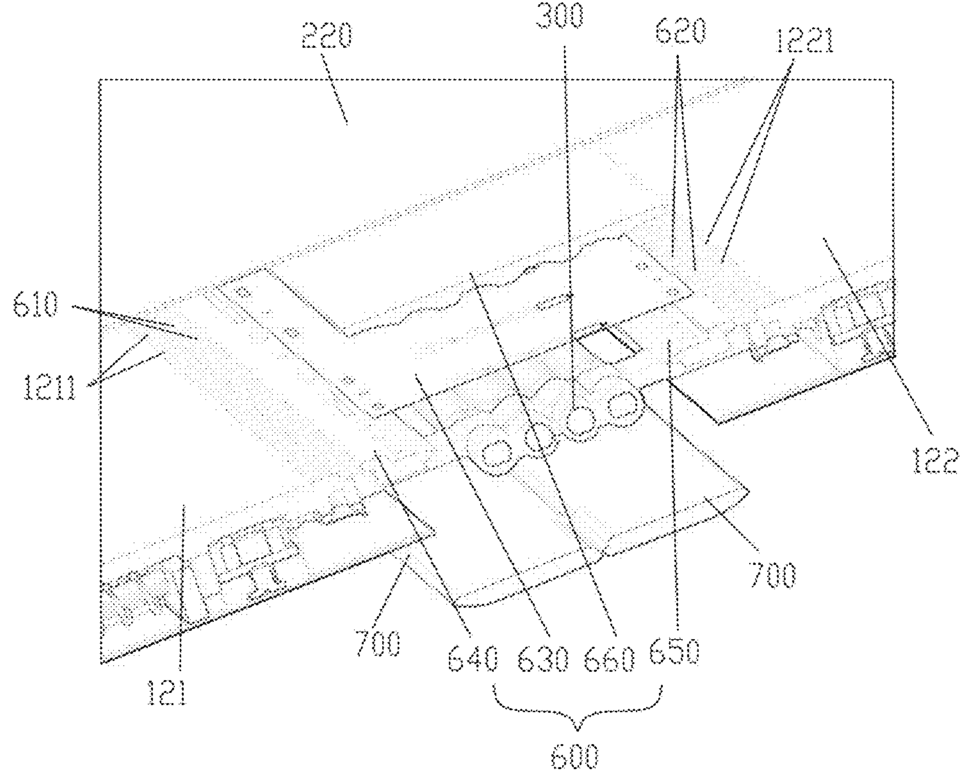
FIG. 10 is another partial structural schematic diagram of an electronic device consistent with the present disclosure.

In one embodiment shown in FIG. 10, the support assembly 600 may include a support piece 630, a first connection member 640, and a second connection member 650. The support piece 630 may have a first end and a second end opposite to each other. The first connection member 640 may be connected to the first end of the supporting piece 630, and the second connection member 650 may be connected to the second end of the supporting piece 630. The first connection member 640 may be connected to the first sub-body 121 through the third elastic assembly 530. The second connection member 650 may be connected to the second sub-body 121 through the fourth elastic assembly 540. At least a portion of the support piece 630 may be disposed between the second part 220 and the rotation shaft assembly 300. The first connection member 640 may be disposed between the rotation shaft assembly 300 and the first sub-body 121. The at least two first protrusions 610 may be disposed at the first connection member 640, and the at least two second protrusions 620 may be disposed at the second connection member 650. By disposing the thin support piece 630 between the second part 220 and the rotation shaft assembly 300, the thickness of the electronic device may be reduced.

The material of the support piece 630 is not limited in the present disclosure. For example, in one embodiment, the support piece 630 may be made of a material including metal. As an example, in one embodiment, the support piece 630 may be a steel piece. Therefore, the support piece 630 may be thin and have a certain supporting strength. Also, the thin support piece 630 may be able to be deformed.

The materials of the first connection member 640 and the second connection member 650 are not limited in the present disclosure. For example, in one embodiment, the first connection member 640 and the second connection member 650 may be made of a material including plastic.

In one embodiment shown in FIG. 10, the support assembly 600 may further include a buffer member 660. The buffer member 660 may be disposed between the support piece 630 and the rotation shaft assembly 300, such that the support piece 630 supports the second part 220 through the buffer member 660 to prevent the support piece 630 from damaging the second part. 220. The material of the buffer member 660 is not limited in the present disclosure. For example, in one embodiment, the buffer member 660 may be made of a material including silicone.

The electronic device may further include two cover plates 700 disposed at a side of the support assembly 600 facing away from the second part 220. The two cover plates 700 may cover the rotation shaft assembly 300, making the electronic device more neat in appearance.

Figure 8:
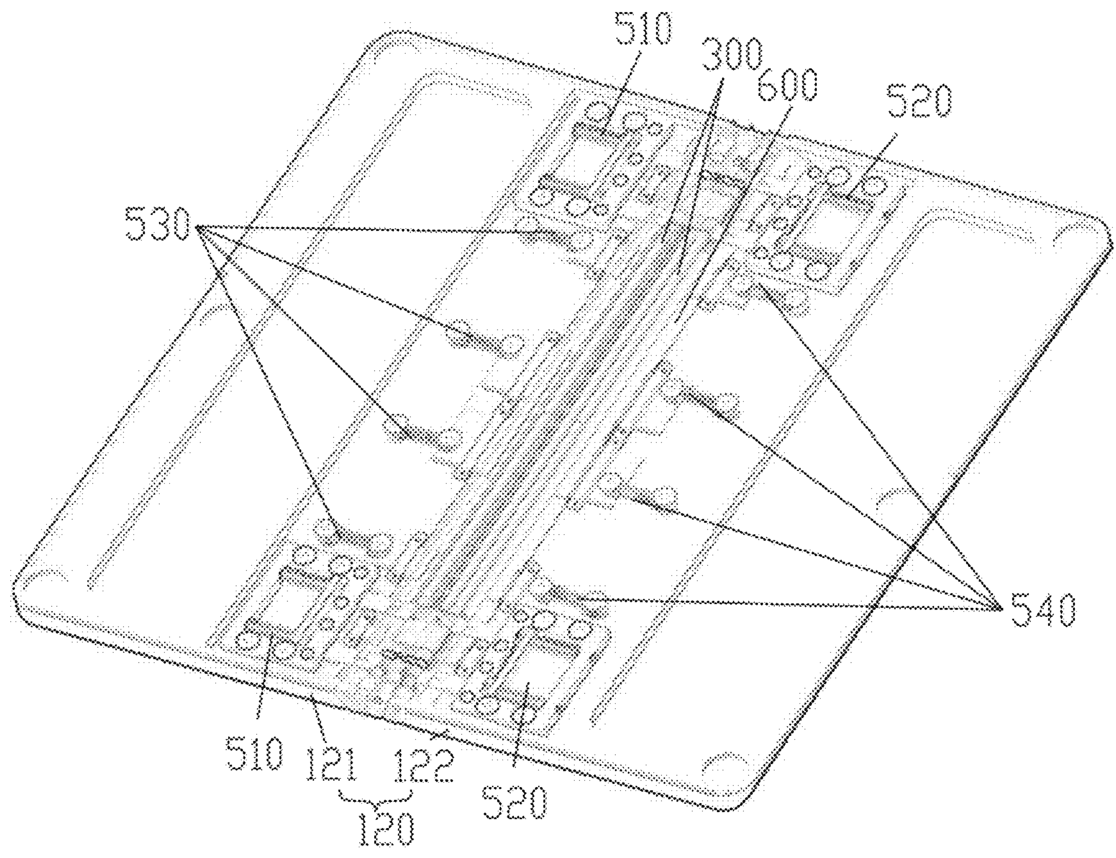
FIG. 8 is another partial structural schematic diagram of an electronic device consistent with the present disclosure.
Figure 9:
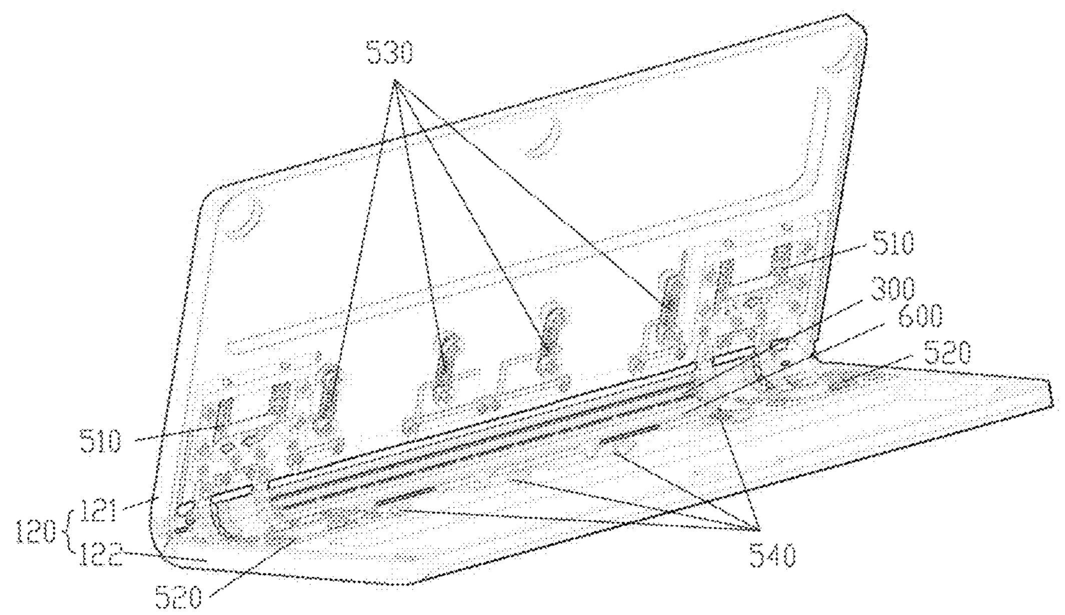
FIG. 9 is another partial structural schematic diagram of an electronic device consistent with the present disclosure.

The structure of the third elastic assemblies 530 is not limited in the present disclosure. For example, one third elastic assembly 530 may include a third spring. The number of the third elastic assemblies 530 is not limited in the present disclosure. For example, as shown in FIG. 8 and FIG. 9, four third elastic assemblies 530 may be disposed between the first sub-body 121 and the support assembly 600 at intervals.

The structure of the fourth elastic assemblies 540 is not limited in the present disclosure. For example, one fourth elastic assembly 540 may include a fourth spring. The number of the fourth elastic assemblies 540 is not limited in the present disclosure. For example, as shown in FIG. 8 and FIG. 9, four fourth elastic assemblies 540 may be disposed between the second sub-body 122 and the support assembly 600 at intervals.

The structure of the first body 110 is not limited in the present disclosure. In one embodiment, the first body 110 may be a plate-shaped structure.

The movable connection between the first body 110 and the first sub-body 121 may be a rotational connection between the first body 110 and the first sub-body 121 or a translational connection between the first body 110 and the first sub-body 121.

When the first body 110 and the first sub-body 121 are rotationally connected, the first part 210 may be able to rotate toward the first direction as the first body 110 rotates relative to the first sub-body 121. In this scenario, the second part 220 may be located in the second direction. For example, as shown in FIG. 3, the second part 220 may be located on the front of the electronic device, and the first part 210 may be located on the back of the electronic device. The first part 210 may be able to rotate toward the second direction as the first body 110 rotates relative to the first sub-body 121. In this scenario, the second part 220 may be also located in the second direction. For example, as shown in FIG. 1, both the first part 210 and the second part 220 may be located on the front of the electronic device.

The translational connection between the first main body 110 and the first sub-body 121 may be similar to the manner in which the first sub-body 121 and the second sub-body 122 are rotationally connected, and will not be described again here.

When the first body 110 and the first sub-body 121 are movably (e.g., translationally) connected, the first part 210 may be able to move (e.g., translate, that is, move translationally) toward the first direction as the first body 110 moves (e.g., translates) relative to the first sub-body 121. In this scenario, the second part 220 may be located in the second direction. For example, as shown in FIG. 2, the second part 220 may be located on the front of the electronic device, and the first part 210 may be located on the back of the electronic device. The first part 210 may be able to move (e.g., translate) toward the second direction as the first body 110 moves relative to the first sub-body 121. In this scenario, the second part 220 may be also located in the second direction. For example, as shown in FIG. 1, both the first part 210 and the second part 220 may be located on the front of the electronic device.

In one embodiment, the movable (e.g., translational) connection between the first body 110 and the first sub-body 121 may be achieved through a slide rail structure.

Figure 20:
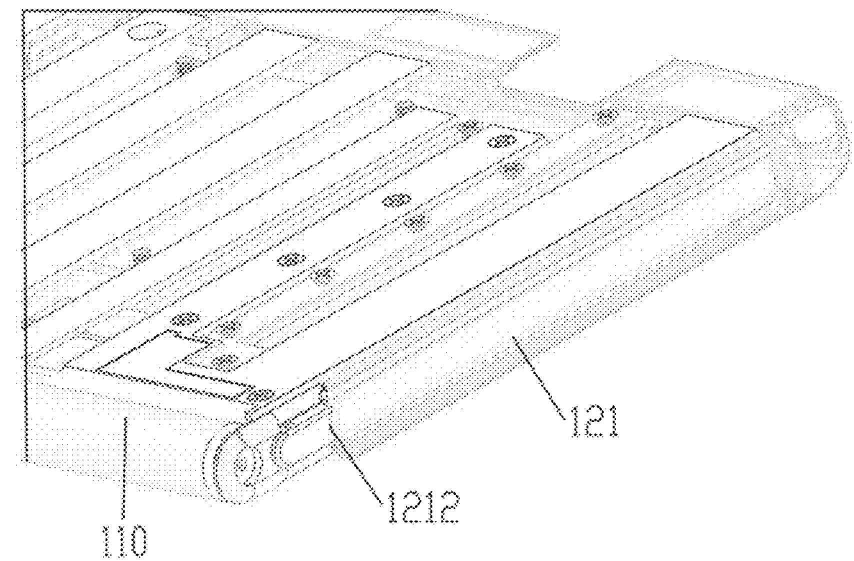
FIG. 20 is another partial structural schematic diagram of an electronic device consistent with the present disclosure.

In one embodiment shown in FIG. 20, the first sub-body 121 may include a slide groove 1212, and the first body 110 may be inserted in the slide groove 1212. The first body 110 may be able to slide relative to the first sub-body 121 through the slide groove 1212.

Figure 21:
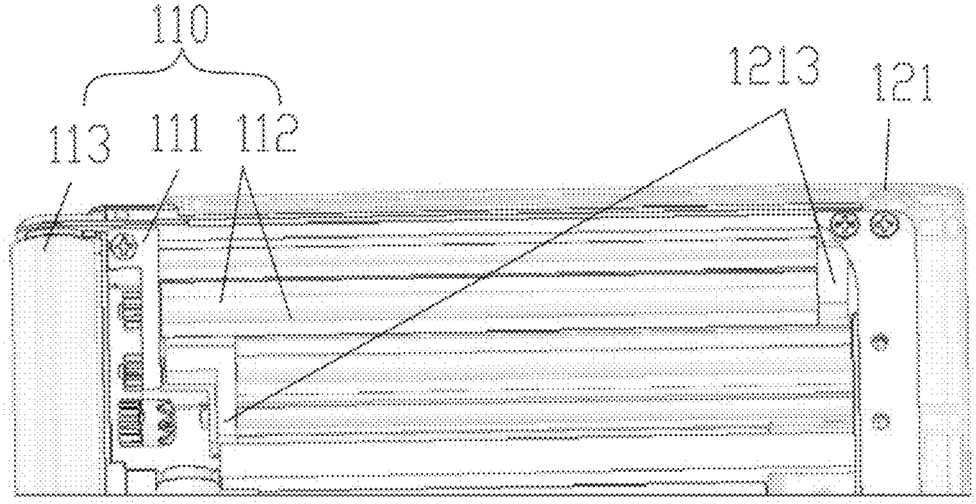
FIG. 21 is another partial structural schematic diagram of an electronic device consistent with the present disclosure.

As shown in FIG. 21, the first sub-body 121 may also include a guide bush 1213 disposed in the slide groove 1212. The first body 110 may include a bracket part 111, a guide rail part 112 and a rotation part 113 disposed at the bracket part 111. The bracket part 111 may be inserted into the slide groove 1212, and the guide rail part 112 may be inserted into the through cavity of the guide bush 1213, such that the guide rail part 112 provides a guiding function to make the first body 110 slide smoothly relative to the first body 110. The rotation part 113 may be rotationally disposed at one end of the bracket part 111 away from the second sub-body 122. When the first body 110 slides relative to the first sub-body 121, the first part 210 may slide along the surface of the rotation part 113 to the first direction or second direction.

The bracket part 111 and the rotation part 113 may be used to support the first part 210.

The first body 110 may be driven to slide by a motor. As an example, in one embodiment, the electronic device may also include a motor. The first body 110 may also include a screw rod. The screw rod may be connected to the drive shaft of the motor. The first sub-body 121 may also include a drive sleeve. The drive sleeve may be sleeved outside the screw rod. When the drive shaft of the motor drives the screw rod to rotate, the screw rod may slide along the drive sleeve, and the bracket part 111 and the guide rail part 112 may slide together.

At least a portion of the first body 110 may be able to move (e.g., translate) into the first sub-body 121, as shown in FIG. 2. Therefore, the first part 210 may be located on the back of the first sub-body 121, and the first region 221 may be located on the front of the first sub-body 121. front. The first body 110 may also be able to move (e.g., translate) to protrude from one end of the first sub-body 121, as shown in FIG. 1. Therefore, the first part 210 and the first region 221 may be located on the same side.

In one embodiment, the body assembly 100 may also include a third body 130, which is movably connected to the second sub-body 122. The display assembly 200 may also include; a third part 230. The third part 230 may be disposed the third body 130. The third part 230 and the first part 210 may be disposed at opposite sides of the second part 220. The third part 230 may be able to move to the first direction or the second direction as the third body 130 moves relative to the second sub-body 122.

The structure of the third body 130 is not limited in the present disclosure. In one embodiment, the third body 130 may be a plate-shaped structure.

The movable connection between the third body 130 and the second sub-body 122 may be a rotational connection between the third body 130 and the second sub-body 122, or may be a translational connection between the third body 130 and the second sub-body 122.

When the third body 130 is rotationally connected to the second sub-body 122, the third part 230 may be able to rotate to face the first direction as the third body 130 rotates relative to the second sub-body 122. In this scenario, the second part 220 may be located in the second direction. For example, the second part 220 may be located on the front of the electronic device, and the third part 230 may be located on the back of the electronic device. The third part 230 may also be able to rotate to face the second direction as the third body 130 rotates relative to the second sub-body 122. In this scenario, the second part 220 may be also located in the second direction. For example, both the third part and the second part 220 may be located on the front side of the electronic device.

The rotational connection between the third body 130 and the second sub-body 122 may be similar to the implementation of the rotational connection between the first sub-body 121 and the second sub-body 122, which will not be described again here.

When the third body 130 is movably (e.g., translationally) connected to the second sub-body 122, the third part 230 may be able to move (e.g., translate) to face the first direction as the third body 130 moves (e.g., translates) relative to the second sub-body 122. In this scenario, the second part 220 may be located in the second direction. For example, the second part 220 may be located on the front of the electronic device, and the third part 230 may be located on the back of the electronic device. The third part 230 may also be able to move (e.g., translate) to face the second direction as the third body 130 moves (e.g., translates) relative to the second sub-body 122. In this scenario, the second part 220 may be also located in the second direction. For example, both the third part and the second part 220 may be located on the front side of the electronic device.

The translational (e.g., slidable) connection between the third body 130 and the second sub-body 122 may be similar to the implementation of the translational (e.g., slidable) connection between the first body 110 and the first sub-body 121, which will not be described again here.

The third body 130 may be able to move (e.g., translate) into the second sub-body 122. In this scenario, the third part 230 may be located on the back of the second sub-body 122, and the second region 222 may be located on the front of the second sub-body 122. The third body 130 may be also able to move (e.g., translate) to protrude from one end of the second sub-body 122. In this scenario, the third portion 230 and the second region 222 may be located on the same side.

The attitude formed by the first part 210, the second part 220 and the third part 230 is not limited in the present disclosure.

Figure 13:
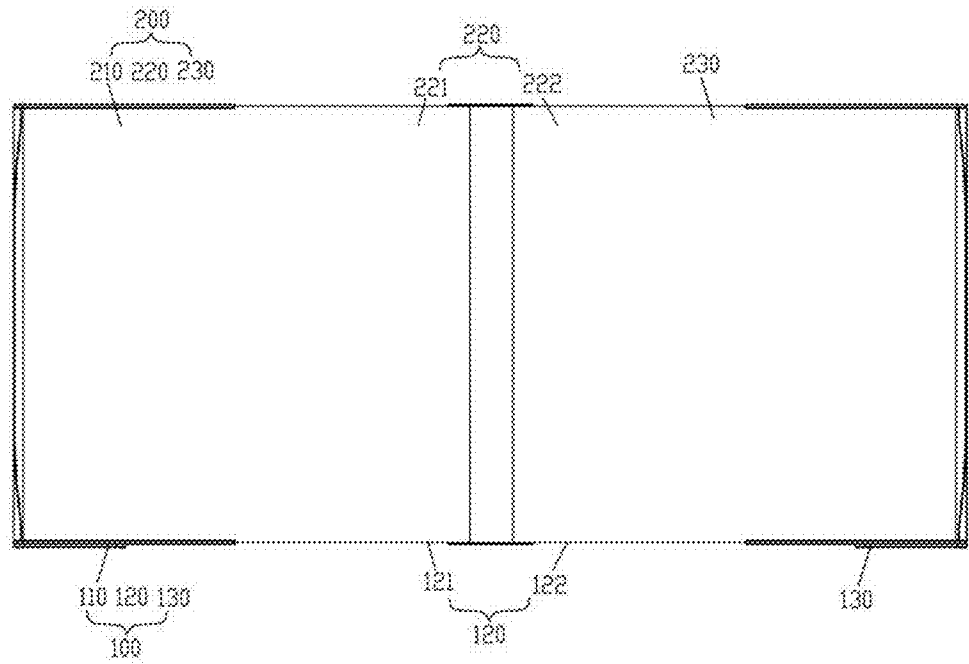
FIG. 13 is another partial structural schematic diagram of an electronic device consistent with the present disclosure.

For example, in one embodiment, when the first part 210 and the third part 230 face the second direction and the first region 221 of the second part 220 and the second region 222 of the second part 220 meet the coplanar condition, the electronic device may be in the first usage mode. In this scenario, the third part 230, the first part 210 and the second part 220 may be located on the same side of the electronic device. For example, the third part 230, the first part 210 and the second part 220 may be located on the front of the electronic device. The third part 230, the first part 210 and the second part 220 may satisfy the coplanarity condition, as shown in FIG. 13.

Figure 14:
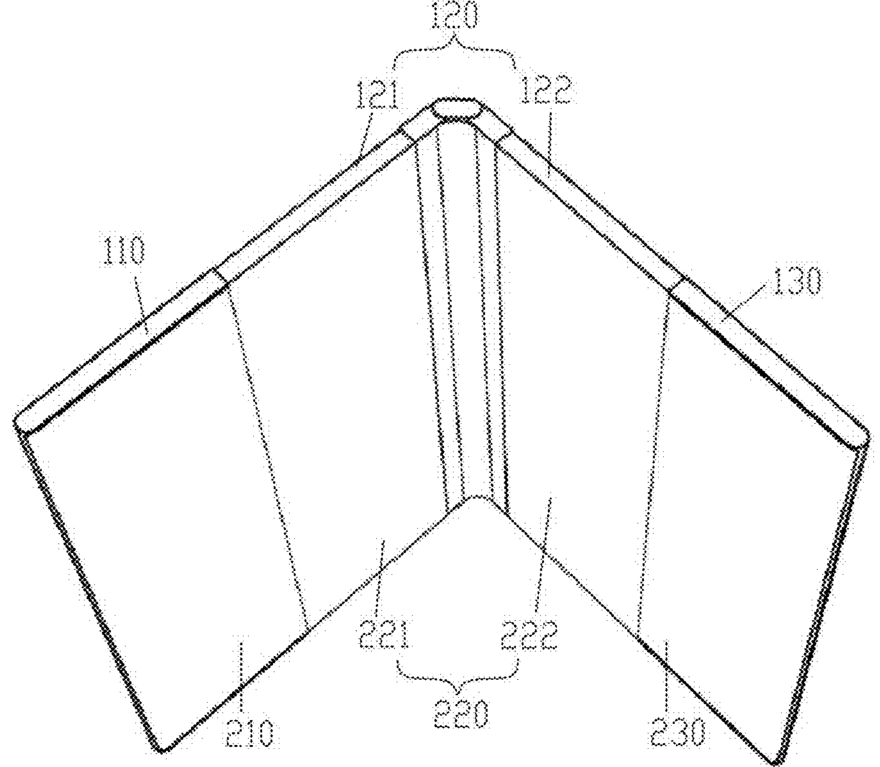
FIG. 14 is another structural schematic diagram of an electronic device consistent with the present disclosure.

In another embodiment, when the first part 210 faces the second direction and the first region 221 of the second part 220 and the second region 222 of the second part 220 form a first included angle, the electronic device may be in the second usage mode. A this time, the first region 221 of the second part 220 and the second region 222 of the second part 220 may be in a non-coplanar state, and the first region 221 of the second part 220 and the first part 210 may satisfy the coplanar condition, as shown in FIG. 14.

The value of the first included angle is not limited in the present disclosure.

Figure 15:
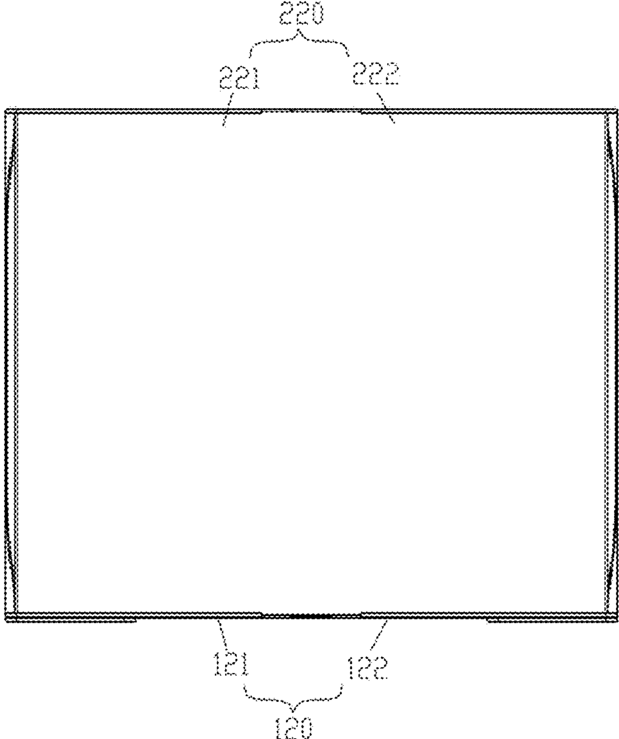
FIG. 15 is another structural schematic diagram of an electronic device consistent with the present disclosure.

In another embodiment, when the first part 210 and the third part 230 face the first direction, and the first region 221 of the second part 220 and the second region 222 of the second part 220 meet the coplanar condition, the electronic device may be in the third usage mode. In this scenario, the first part 210 and the third part 230 may be located on the back of the electronic device, and the second part 220 may be located on the front of the electronic device, as shown in FIG. 15. In this scenario, the first direction and the second direction may meet the opposite condition, and the third part 230 and the first part 210 may satisfy the adjacent condition. That is, the third part 230 and the first part 210 may be close to each other, and the third part 230 and the first part 210 may form a display screen.

In another embodiment, when the first part 210 and the third part 230 face the first direction, and the first region 221 of the second part 220 and the second region 222 of the second part 220 form a second included angle, the electronic device may be in the fourth usage mode. In this scenario, the first region 221 of the second part 220 and the second region 222 of the second part 220 may be in a non-coplanar state, the first region 221 of the second part 220 and the first part 210 may be located on back-to-back sides of the first sub-body 121, and the second region 222 of the second part 220 and the third part 230 may be located on back-to-back sides of the second sub-body 122.

Figure 16:
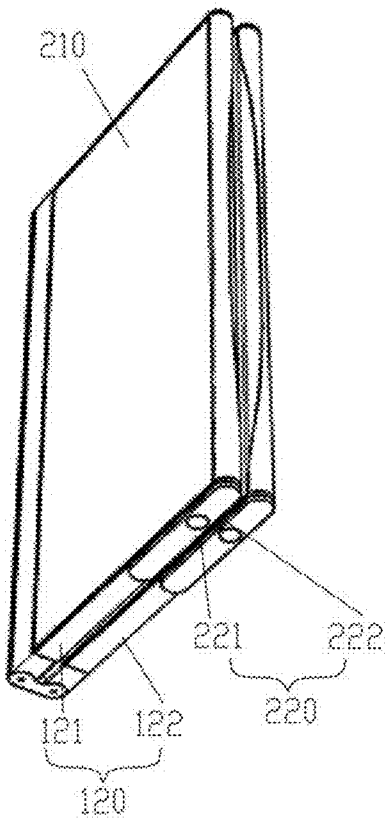
FIG. 16 is another structural schematic diagram of an electronic device consistent with the present disclosure.

The value of the second included angle is not limited in the present disclosure. For example, the value of the second included angle may be 0 degrees, as shown in FIG. 16. In this scenario, the electronic devices may be in an overlapping state, the first region 221 of the second part 220 and the second region 222 of the second part 220 may be sandwiched between the first sub-body 121 and the second sub-body 122, and the first part 210 and the third part 230 may be located outside the electronic device. In the overlapping state, the electronic device may also be able to display through the first part 210 and the third part 230, and may occupy less space.

By rotating the second sub-body 122 relative to the first sub-body 121, the first region 221 of the second part 220 and the second region 222 of the second part 220 may satisfy the coplanar condition or form a certain included angle. By moving the first body 110 relative to the first sub-body 121, the first part 210 may be positioned in the first direction or the second direction. By moving the third body 130 relative to the second sub-body 122, the third part 230 may be positioned in the first direction or the second direction. Therefore, the display assembly 200 may have different attitudes, the length of the display assembly 200 may be changed, and the electronic device may be enabled to switch between different modes.

Figure 23:
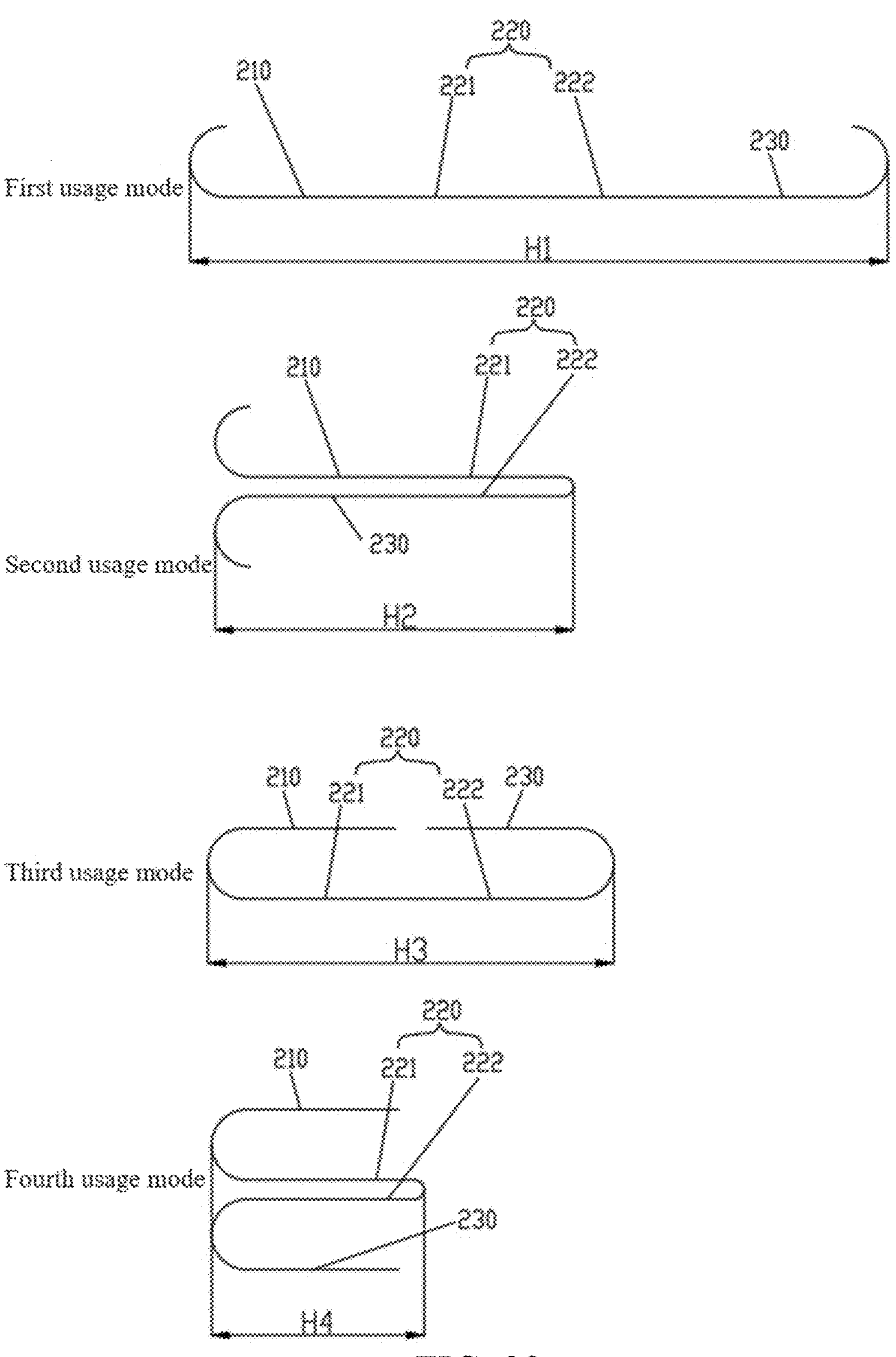
FIG. 23 is a schematic diagram showing a comparison of the length of the display assembly of the electronic device in four usage modes consistent with the present disclosure.

As shown in FIG. 23, the maximum length of the display assembly 200 in the first usage mode may be H1, and the maximum length of the display assembly 200 in the second usage mode may be H2. When the length of the first part 210 is equal to the length of the third part 230 and the length of the first region 221 of the second part 220 is equal to the length of the second region 222 of the second part 220, H2 may be approximately half of H1. The maximum length of the display assembly 200 in the third usage mode may be H3. H3 may be the length of the second part 220. The maximum length of the display assembly 200 in the fourth usage mode may be H4. When the length of the first region 221 of the second part 220 and the length of the second region 222 of the second part 220 is equal, H4 may be about half of H3.

When the first body 110 and the third body 130 slide relative to the second body 120, the maximum length of the display assembly 200 may vary from H1 in the first usage mode to H3 in the third usage mode. The length of the display assembly 200 may also vary between H2 in the second mode of use to H4 in the fourth mode of use.

When the second sub-body 122 rotates relative to the first sub-body 121, the maximum length of the display assembly 200 may vary from H1 in the first usage mode to H2 in the second usage mode. The maximum length of the display assembly 200 may also vary between H3 in the third usage mode and H4 in the fourth usage mode.

In one application, in the first usage mode, the display assembly 200 may form a 21-inch large display screen with a ratio of 21:9. In this scenario, the electronic device may be similar to a large display mode. In the second usage mode, the display assembly 200 may form two display screens with a certain angle. In this scenario, the electronic device may be similar to a notebook mode. In the third usage mode, the display assembly 200 may form two small display screens arranged back to back. In this scenario, the electronic device may be similar to a tablet mode, and the size of the electronic device may become smaller. The size of the small display screens may be 23CM×13CM, and the electronic device may be easy to carry. In the fourth usage mode as shown in FIG. 16, the display assembly 200 may form two minimum display screens arranged back to back. That is, the size of the display screens may be the size of the first part 210 or the second part 220. In this scenario, the electronic device may be similar to a mobile phone mode, and the electronic device may be operated through the first part 210 and/or the second part 220. The electronic device may have the smallest size and may be easy to hold or carry. In the present disclosure, the electronic device may be placed in different modes according to the usage scenario, without the need for multiple settings. The adaptability of the electronic device may be significantly improved.

In the above usage modes of the electronic device shown in FIG. 13 to FIG. 16, the first part 210 and the third part 230 may be located in the first direction or the second direction at the same time. In other embodiments, the electronic device may also include other usage modes in which the first part 210 and the third part 230 may also be located in different directions.

In some other embodiments, the second body 120 may also be an integral structure. Each region of the second part 220 may always meet the coplanar condition. The first part 210 may be able to move to face the first direction or the second direction through the movement of the first body 110 relative to the second body 120, and the third part 230 may be able to move to face the first direction or the second direction through the movement of the third body 130 relative to the second body 120.

In some embodiments, the display assembly 200 may include a first part 210, a second part 220, and a third part 230, adjacent to each other. The first part 210 may face the first direction, the second part 220 may face the second direction, and the third part 230 may face the first direction. The first direction and the second direction satisfy the opposite condition, and the first part 210 and the third part 230 may satisfy the adjacent condition. Therefore, a display screen may be formed in the first direction through the first part 210 and the third part 230.

In one embodiment, the display assembly 200 may be a flexible screen, and the first part 210, the second part 220 and the third part 230 may be different parts of the same display screen. For example, the display assembly 200 may be an organic light-emitting diode (OLED).

In one embodiment, the second direction may be the front of the electronic device, and the first direction may be the back of the electronic device. Therefore, the electronic device may be able to display on the front through the second part 220 and display on the back through the first part 210 and the third part 230 is shown.

In one embodiment, the opposite condition may refer to being opposite or substantially opposite, and the adjacent condition may refer to being adjacent or substantially adjacent. The first part 210 and the third part 230 may satisfy the adjacent condition. In this scenario, one end of the first part 210 away from the second part 220 may be adjacent to one end of the third part 230 away from the second part 220. The first part 210 and the third part 230 may look like a screen, and there may be only a gap at the adjacent ends of the first part 210 and the second part 220.

The implementation manner in which the first part 210 and the third part 230 satisfy the adjacent condition is not limited in the present disclosure. For example, in one embodiment, the first part 210 may be provided on the first body 110 of the body assembly 100, the second part 220 may be provided on the second body 120 of the body assembly 100, and the third part 230 may be provided on the third body 130 of the body assembly 100. Through the movement (e.g., translational movement) of the first body 110 and the third body 130 relative to the second body 120, the first part 210 and the third part 230 may satisfy the adjacent condition. Through the first body 110 and the third body 130 rotating relative to the second body 120, the first part 210 and the third part 230 may satisfy the adjacent condition. Of course, in another embodiment, the first part 210 and the third part 230 may also satisfy the adjacent condition through the rotation of the first body 110 relative to the second body 120 and the movement (e.g., translational movement) of the third body 130 relative to the second body 120.

Of course, in other embodiments, there may also be a certain gap between the first part 210 and the third part 230, that is, the first part 210 and the third part 230 may not satisfy the adjacent condition.

In one embodiment, the image data may include first image data, and the first image data may include first content and second content. The first content may be displayed in the second part 220 and the second content may be displayed in combination of the first part 210 and the third part 230. That is, the first part 210 and the third part 230 may cooperate to display the second content, and the first part 210 and the third part 230 may display different parts of the second content. The display sizes of the first content and the second content may meet the same conditions.

The same condition may refer to the same or substantially the same. The display sizes of the first content and the second content may satisfy the same condition. That is, the combined size of the first part 210 and the third part 230 may be the same or substantially the same as the size of the second part 220. For example, the first content and the second content may be both game video images of the same size and the same content. In this scenario, the game video image of the same size may be displayed through the second part 220 on the front of the electronic device, and the game video image of the same size may be displayed on the back of the electronic device through the combination of the first part 210 and the third part 230. As another example, the first content and the second content may be different video images of the same size. In this scenario, the game video image of the same size may be displayed through the second part 220 on the front of the electronic device, and the first part 210 and the third part 230 are combined to display the movie video image of the same size on the back of the electronic device.

The first content and the second content may be the same or different.

Figure 17:
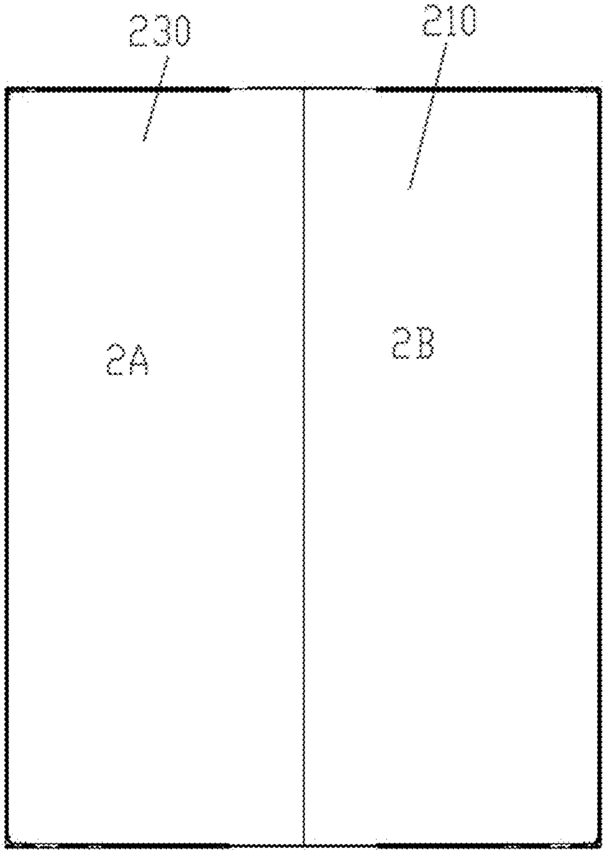
FIG. 17 is another structural schematic diagram of an electronic device consistent with the present disclosure.
Figure 18:
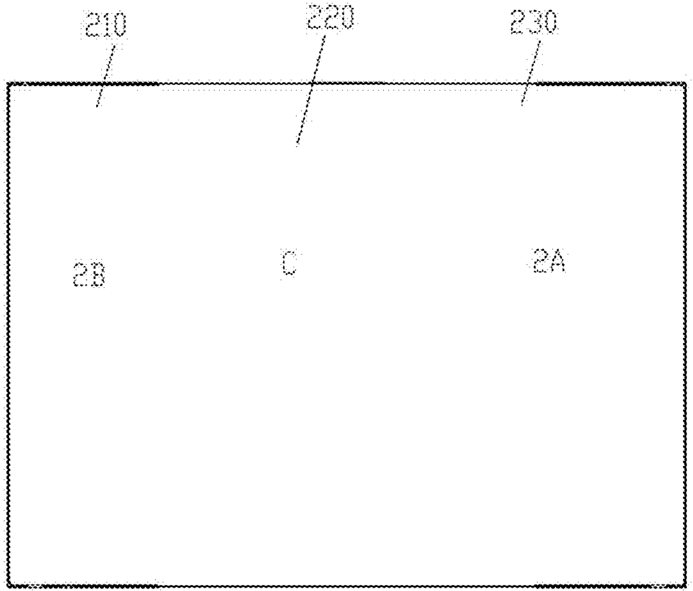
FIG. 18 is another structural schematic diagram of an electronic device consistent with the present disclosure.

As an example, in one embodiment shown in FIG. 17, the second content may include a first portion 2A and a second portion 2B in an order. The first image data may include the second portion 2B of the second content, the first content C, and the first portion 2A of the second content in an order. Therefore, the second portion 2B may be displayed in the first part 210 and the first portion 2A may be displayed in the third part 230. When the first part 210, the second part 220 and the third part 230 are all facing the second direction, the first image data is as shown in FIG. 18.

The order may refer to that the content is arranged in order from left to right.

In one embodiment, the first content and the second content may be different. The first content may be a picture and the second content may be text. For example, the second content is "The weather is very good today"; the first portion 2A is "The weather is," and the second portion 2B is: "very good today." The first content is a sky picture. The first image data from left to right is: "very good today," the sky picture and "The weather is." In this scenario, the second part 220 displays the first content. the sky picture, on the front of the electronic device. The third part 230 and the first part 210 display the second content. "The weather is very good today" on the back of the electronic device.

The display structure in existing technologies displays the default order from left to right, that is, the first image data from left to right is: "The weather is, "the sky picture and" very good today." In this scenario, the second part 220 displays the first content, the sky picture, on the front of the electronic device. The third part 230 and the first part 210 display the second content, "is very good today The weather," on the back of the electronic device, that is, there is a problem with the display order of the second content. In the present disclosure, since the first image data includes the second portion 2B of the second content, the first content C, and the first portion 2A of the second content in an orderly manner, that is, the order of the second portion 2B of the second content and the first portion 2A of the second content are reversed in advance, the display order of the second content may be a normal order, and the display order may be from the first portion 2A of the second content to the second portion 2B of the second content.

In another embodiment, the first content and the second content may be the same. The first content may be text and the second content may be text. For example, the second content is "The weather is very good today"; the first portion 2A is "The weather is," and the second portion 2B is: "very good today." The first content is "The weather is very good today." The first image data from left to right is: "very good today," "The weather is very good today," and "The weather is." In this scenario, the second part 220 displays the first content, "The weather is very good today," on the front of the electronic device. The third part 230 and the first part 210 display the second content. "The weather is very good today" on the back of the electronic device.

The display structure in existing technologies displays the default order from left to right, that is, the first image data from left to right is: "The weather is," "The weather is very good today, "and" very good today." In this scenario, the second part 220 displays the first content, "The weather is very good today," on the front of the electronic device. The third part 230 and the first part 210 display the second content, "is very good today The weather," on the back of the electronic device, that is, there is a problem with the display order of the second content. In the present disclosure, since the first image data includes the second portion 2B of the second content, the first content C, and the first portion 2A of the second content in an orderly manner, that is, the order of the second portion 2B of the second content and the first portion 2A of the second content are reversed in advance, the display order of the second content may be a normal order, and the display order may be from the first portion 2A of the second content to the second portion 2B of the second content.

The processing device may be configured to process the image data to generate the first image data, such that the display order of on the back of the electronic device is a normal order.

The method used by the processing device to process the image data is not limited in the present disclosure.

As an example, in one embodiment, the method used by the processing device may include:

- S1: the processing device determines the first content and the second content, and determines the first portion 2A of the second content and the second portion 2B of the second content;
- S2: the processing device cuts the image data from left to right into: the first portion 2A of the second content, the first content, and the first portion 2B of the second content; and
- S3: the processing device interchanges the order of the first portion 2A of the second content and the second portion 2B of the second content to generate the first image data. The first image data may include the first portion 2A of the second content, the first content, and the second portion 2B of the second content, such that the display order of on the back of the electronic device is a normal order.

Figure 19:
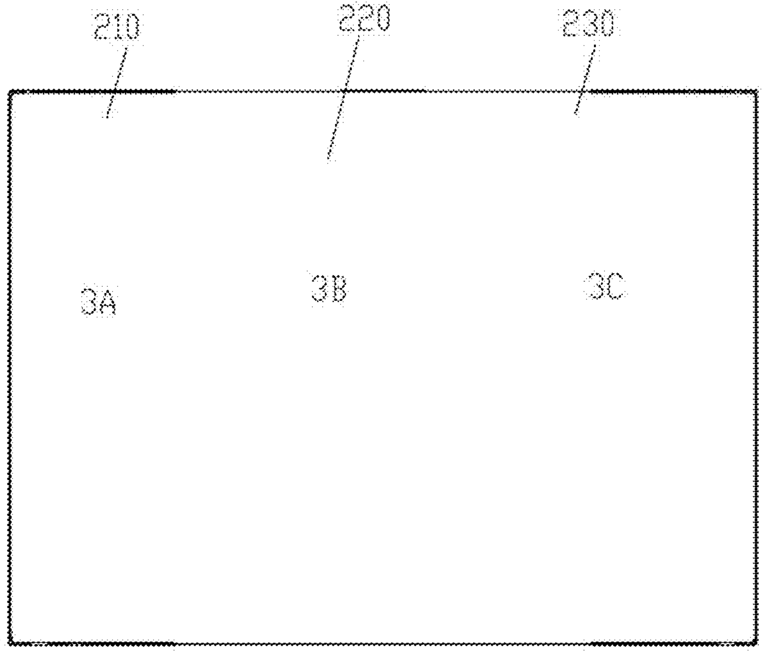
FIG. 19 is another structural schematic diagram of an electronic device consistent with the present disclosure.

In one embodiment, as shown in FIG. 19, the image data may include second image data, and the second image data may include third content. The third content may be displayed on the first part 210, the second part 220, and the third part 230. The third content may include a third portion 3A, a fourth portion 3B, and a fifth portion 3C in order. The third portion 3A may be displayed on the first part 210, the fourth portion 3B may be displayed on the second part 220, and the fifth portion 3C may be displayed on the third part 230. The second image data may include the third portion 3A, the fourth portion 3B, and the fifth portion 3C in an orderly manner. Therefore, the first part 210 and the third part 230 may face the second direction; such that the first part 210, the second part 220 and the third part 230 form a large display screen, and the third content is displayed through the large display screen.

In one embodiment, the processing device may be configured to control the display content of the display assembly 200, such that the processing device controls the display assembly 200 to display in different ways when the electronic device is in different attitudes.

In one embodiment, the electronic device may have a folded first attitude and an unfolded second attitude. The forms of the first attitude and the second attitude are not limited in the present disclosure. For example, in one embodiment, the first attitude may be a state as shown in FIG. 17 in which the first part 210 and the third part 230 face the first direction and the second part 220 faces the second direction. The second attitude may be a state as shown in FIG. 18 and FIG. 19, in which the first part 210, the third part 230 and the second part 220 all face the second direction.

The processing device may be configured to determine that the electronic device is in the first attitude to control the display assembly 200 to display the first image data, as shown in FIG. 17, and may also be used to determine that the electronic device is in the second attitude to control the display assembly 200 to display the second image data, as shown in FIG. 19.

The manner in which the processing device determines that the electronic device is in the first attitude or the second attitude is not limited in the present disclosure. For example, in one embodiment, the electronic device may further include a position detection assembly capable of detecting the positions of the first part 210 and the third part 230 relative to the second part 220, and the processing device may determine the attitude of the electronic device based on the positions of the first part 210 and the third part 230 relative to the second part 220 detected by the position detection assembly.

The implementation in which the first part 210 and the third part 230 are able to face both the first direction and the second direction has been described above, and will not be described again here.

As an example, in one embodiment, the body assembly 100 may include a first body 110, a second body 120, and a third body 130. The first body 110 may be connected to the first part 210; the second body 120 may be connected to the second part 220; and the third body 130 may be connected to the third part 230.

The first body 110 may be rotationally connected to the second body 120, the third body 130 may be rotationally connected to the second body 120. The first part 210 and the second part 220 may be able to rotate relative to each other, and the third part 230 and the second part 220 may be able to rotate relative to each other; such that the first part 210 faces the first direction, the second part 220 faces the second direction, and the third part 230 faces the first direction.

The first body 110 and the second body 120 may be rotationally connected through a rotation shaft structure, and the third body 130 and the second body 120 may be rotationally connected through a rotation shaft structure.

By rotating the first body 110 relative to the second body 120 and rotating the third body 130 relative to the second body 120, the first part 210, the second part 220 and the third part 230 may also all face the second direction.

As another example, in another embodiment, the body assembly 100 may include a first body 110, a second body 120, and a third body 130. The first body 110 may be connected to the first part 210; the second body 120 may be connected to the second part 220; and the third body 130 may be connected to the third part 230. The first part 210 and the second part 220 may be able to slide relative to each other, and the third part 230 and the second part 220 may be able to slide relative to each other. The first part 210 may be able to move from the first side to the second side of the second body 120 when the first body 110 slides relative to the second body 120, and the third part 230 may be able to move from the first side to the second side of the second body 120 when the third body 130 slides relative to the second body 120, such that the first part 210 faces the first direction, the second part 220 faces the second direction, and the third part 230 faces the first direction.

The first body 110 and the second body 120 may be slidingly connected through a slide rail structure, and the third body 130 and the second body 120 may also be slidingly connected through a slide rail structure.

By the first body 110 sliding relative to the second body 120 and the third body 130 sliding relative to the second body 120, the first part 210, the second part 220 and the third part 230 may also all face the second direction.

Figure 22:
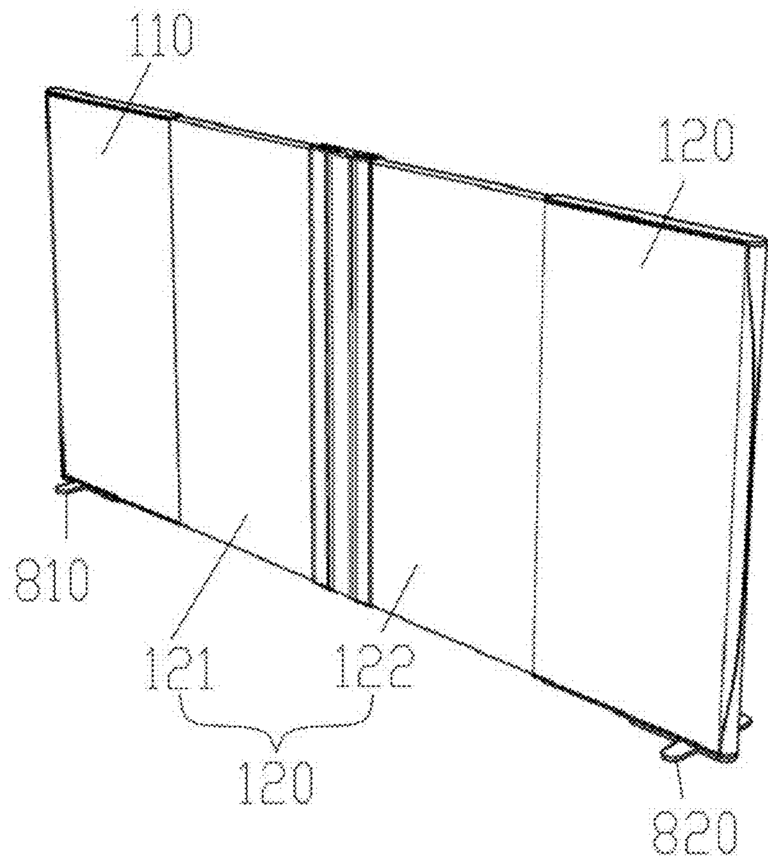
FIG. 22 is another structural schematic diagram of an electronic device consistent with the present disclosure.

In one embodiment, as shown in FIG. 22, the electronic device may further include a first support rod 810 and a second support rod 820. The first support member 810 may be movably provided at the bottom end of the first body 110. The first support member 810 may be able to move to be accommodated on the surface of the first body 110 or in a first receiving groove of the first body 110. The first support member 810 may also be able to move to protrude from the surface of the first body 110. The second support member 820 may be movably disposed at the bottom end of the third body 130. The second support member 820 may be able to move to be stored on the surface of the third body 130 or in a second storage groove of the third body 130. The second support member 820 may also be able to move to protrude from the surface of the third body 130.

When the first support member 810 moves to protrude from the surface of the first body 110 and the second support member moves to protrude from the surface of the third body 130, the first support member 810 and the second support member 820 may support the electronic device, as shown in FIG. 22.

The structures of the first support member 810 and the second support member 820 are not limited in the present disclosure. For example, in one embodiment, both the first support member 810 and the second support member 820 may be strip structures.

In one embodiment, the first support member 810 may be able to move or rotate relative to the first body 110. The second support member 820 may be able to move or rotate relative to the third body 130.

As an example, in one embodiment, the first support member 810 may be able to move relative to the first body 110 to protrude from the surface of the first body 110, and the first support member 810 may also be able to rotate at a first set angle relative to the first body 110. The projection of the first support member 810 on the first body 110 along the moving direction may be located outside the first body 110. The second support member 820 may be able to move relative to the third body 130 to protrude from the surface of the third body 130, and the second support member 820 may also be able to rotate at a second set angle relative to the third body 130. The projection of the second support member 820 on the third body 130 along the moving direction may be located outside the third body 130. Therefore, the support stability of the first support member 810 and the second support member 820 may be improved.

The values of the first set angle and the second set angle are not limited in the present disclosure. For example, in one embodiment, the first set angle and the second set angle may be 90 degrees.

Various embodiments have been described to illustrate the operation principles and exemplary embodiments. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. An electronic device comprising:

a body assembly including a processing device configured to at least process image data; and a display assembly configured to display the image data and including a first part and a second part, the display assembly is configured such that when the first part faces a first direction, the second part is capable of facing a second direction;

wherein the body assembly includes:

a first body;

a second body including:

a first sub-body movably connected to the first body; and a second sub-body rotationally connected to the first sub-body;

a rotation shaft assembly;

a first elastic assembly connected to the first sub-body and a first end of the rotation shaft assembly;

a second elastic assembly connected to the second sub-body and a second end of the rotation shaft assembly opposite to the first end; and a support assembly at least partially disposed between the second part and the rotation shaft assembly, connected to the first sub-body through a third elastic assembly, and connected to the second sub-body through a fourth elastic assembly, the support assembly being configured to, when the first sub-body rotates relative to the second sub-body, change a distance between the support assembly and the first sub-body and a distance between the support assembly and the second sub-body, to support a portion of the second part corresponding to the rotation shaft assembly.

2. The electronic device according to claim 1, wherein:

the first part and the second part of the display assembly are adjacent to each other;

the first part is disposed at the first body and is configured to move to face the first direction or the second direction as the first body moves relative to the first sub-body; and the second part includes:

a first region disposed at the first sub-body; and a second region disposed at the second sub-body and configured to move to be opposite to the first region as the second sub-body rotates relative to the first sub-body.

3. The electronic device according to claim 1, wherein:

the body assembly further includes a third body movably connected to the second sub-body;

the display assembly further includes a third part disposed at the third body;

the third part and the first part are located on opposite sides of the second part; and the third part is configured to move to face the first direction or face the second direction as the third body moves relative to the second sub-body.

4. The electronic device according to claim 2, wherein:

when the first part faces the second direction, and the first region of the second part and the second region of the second part meet a coplanar condition, the electronic device is in a first usage mode;

when the first part faces the second direction, and the first region of the second part and the second region of the second part form a first included angle, the electronic device is in a second usage mode;

when the first part faces the first direction, and the first region of the second part and the second region of the second part meet the coplanarity condition, the electronic device is in a third usage mode; and when the first part faces the first direction, and the first region of the second part and the second region of the second part form a second included angle, the electronic device is in a fourth usage mode.

5. The electronic device according to claim 4, wherein the electronic device is configured to:

switch between the first usage mode and the second usage mode or switch between the third usage mode and the fourth usage mode, when the first sub-body rotates relative to the second sub-body;

switch between the first usage mode and the third usage mode when the first body moves relative to the first sub-body;

switch between the first usage mode and the fourth usage mode or switch between the second usage mode and the fourth usage mode, when the first sub-body rotates relative to the second sub-body and the first body moves relative to the first sub-body.

6. The electronic device according to claim 4, wherein the first included angle is different from the second included angle.

7. The electronic device according to claim 1, wherein:

the display assembly further includes a third part;

the first part, the second part, and the third part are adjacent to one another;

the first part faces the first direction, the second part faces the second direction, and the third part faces the first direction;

the first direction and the second direction satisfy an opposite condition; and the first part and the third part satisfy an adjacent condition.

8. The electronic device according to claim 7, wherein:
the image data includes first content and second content, display sizes of the first content and the second content meeting a same condition;
the second part is configured to display the first content;
the first part and the third part are configured to display the second content together.

9. The electronic device according to claim 8, wherein:
the second content includes a first portion and a second portion in an order;
the image data includes the second portion of the second content, the first content, and the first portion of the second content in an order, such that the second portion is displayed on the first part and the first portion is displayed on the third part.

10. The electronic device according to claim 8, wherein:
the image data is first image data;
the processing device is further configured to process second image data, and the second image data includes third content;
the third content is displayed on the first part, the second part, and the third part;
the third content includes a first portion, a second portion, and a third portion in an order;
the first portion is displayed on the first part, the second portion is displayed on the second part, and the third portion is displayed on the third part; and
the second image data includes the first portion, the second portion, and the third portion in an orderly manner.

11. The electronic device according to claim 10, wherein:
the electronic device has a folded first attitude and an unfolded second attitude; and
the processing device is configured to control the display assembly to display the first image data in response to determining that the electronic device is in the first attitude, and to control the display assembly to display the second image data in response to determining that the electronic device is in the second attitude.

12. The electronic device according to claim 7, wherein:
the body assembly further includes a third body;
the first body is connected to the first part;
the second body is connected to the second part;
the third body is connected to the third part;
the first body is rotationally connected to the second body and the third body is rotationally connected to the second body; and
the first part and the second part are configured to rotate relative to each other, and the third part and the second part are configured to rotate relative to each other, such that the first part faces the first direction, the second part faces the second direction, and the third part faces the first direction.

13. The electronic device according to claim 7, wherein:
the body assembly further includes a third body;
the first body is connected to the first part;
the second body is connected to the second part;
the third body is connected to the third part;
the first part and the second part are configured to slide relative to each other, and the third part and the second part are configured to slide relative to each other; and
the first part is configured to move from a first side of the second body to a second side of the second body when the first body slides relative to the second body, and the third part is configured to move from a first side of the second body to the second side of the second body when the third body slides relative to the second body, such that the first part faces the first direction, the second part faces the second direction, and the third part faces the first direction.

14. An electronic device comprising:
a body assembly including a processing device configured to at least process image data; and
a display assembly configured to display the image data and including a first part, a second part, and a third part, the display assembly is configured such that when the first part faces a first direction, the second part is capable of facing a second direction;
wherein:
the first part, the second part, and the third part are adjacent to one another;
the first part faces the first direction, the second part faces the second direction, and the third part faces the first direction;
the first direction and the second direction satisfy an opposite condition;
the first part and the third part satisfy an adjacent condition;
the body assembly includes a first body, a second body, and a third body;
the first body is connected to the first part, the second body is connected to the second part, and the third body is connected to the third part;
the first part and the second part are configured to slide relative to each other, and the third part and the second part are configured to slide relative to each other; and
the first part is configured to move from a first side of the second body to a second side of the second body when the first body slides relative to the second body, and the third part is configured to move from a first side of the second body to the second side of the second body when the third body slides relative to the second body, such that the first part faces the first direction, the second part faces the second direction, and the third part faces the first direction.

15. An electronic device comprising:
a body assembly including a processing device configured to at least process first image data and second image data; and
a display assembly configured to display the first image data and the second image data, and including a first part, a second part, and a third part, the display assembly is configured such that when the first part faces a first direction, the second part is capable of facing a second direction;
wherein:
the first part, the second part, and the third part are adjacent to one another;
the first part faces the first direction, the second part faces the second direction, and the third part faces the first direction;
the first direction and the second direction satisfy an opposite condition;
the first part and the third part satisfy an adjacent condition;
the first image data includes first content and second content, display sizes of the first content and the second content meeting a same condition, and the second image data includes third content;

the second part is configured to display the first content, the first part and the third part are configured to display the second content together;

the third content is displayed on the first part, the second part, and the third part;

the third content includes a first portion, a second portion, and a third portion in an order, the first portion is displayed on the first part, the second portion is displayed on the second part, and the third portion is displayed on the third part; and the second image data includes the first portion, the second portion, and the third portion in an orderly manner.

* * * * *